(12) United States Patent
Morrison et al.

(10) Patent No.: US 9,074,592 B2
(45) Date of Patent: Jul. 7, 2015

(54) DEPLOYMENT OF DOWNHOLE PUMP USING A CABLE

(75) Inventors: Montie W. Morrison, Sugar Land, TX (US); Joseph Varkey, Sugar Land, TX (US); Barry Lee Schuler, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 227 days.

(21) Appl. No.: 13/116,550

(22) Filed: May 26, 2011

(65) Prior Publication Data

US 2011/0297397 A1 Dec. 8, 2011

Related U.S. Application Data

(60) Provisional application No. 61/349,541, filed on May 28, 2010.

(51) Int. Cl.
| | |
|---|---|
| *E21B 23/01* | (2006.01) |
| *F04B 47/02* | (2006.01) |
| *E21B 17/20* | (2006.01) |
| *E21B 43/12* | (2006.01) |
| *H02G 1/08* | (2006.01) |
| *H02G 9/06* | (2006.01) |

(52) U.S. Cl.
CPC ............. *F04B 47/02* (2013.01); *E21B 17/20* (2013.01); *E21B 43/128* (2013.01); *H02G 1/08* (2013.01); *H02G 9/06* (2013.01)

(58) Field of Classification Search
USPC ............... 166/382, 65.1, 66.4, 68, 105, 77.1, 166/242.2
See application file for complete search history.

(56) References Cited

U.S. PATENT DOCUMENTS

| 3,049,775 A | * | 8/1962 | Ondeck .................... 403/365 |
| 3,467,224 A | * | 9/1969 | Curtis et al. ............. 188/65.1 |
| 3,468,258 A | * | 9/1969 | Arutunoff ................. 166/212 |
| 3,638,732 A | * | 2/1972 | Huntsinger et al. ...... 166/379 |
| 3,672,795 A | * | 6/1972 | Arutunoff et al. ....... 417/423.3 |
| 3,679,812 A | * | 7/1972 | Owens .................... 174/108 |
| 4,128,127 A | * | 12/1978 | Taylor ..................... 166/105 |
| 4,440,221 A | * | 4/1984 | Taylor et al. ............. 166/106 |
| 4,621,689 A | * | 11/1986 | Brookbank, III ......... 166/106 |
| 4,665,281 A | * | 5/1987 | Kamis .................... 174/102 R |
| 4,844,210 A | * | 7/1989 | Wong ..................... 188/65.1 |
| 4,928,771 A | * | 5/1990 | Vandevier ................ 166/385 |

(Continued)

FOREIGN PATENT DOCUMENTS

| EP | 2077374 | | 7/2009 | |
| WO | WO2009/077714 | * | 6/2009 | ............. E21B 17/20 |

OTHER PUBLICATIONS

Office Action, U.S. Appl. No. 13/034,254, dated May 9, 2013.

(Continued)

*Primary Examiner* — Blake Michener
(74) *Attorney, Agent, or Firm* — Michael Stonebrook

(57) ABSTRACT

Embodiments disclosed herein relate to a method and a system to deploy a downhole pump within a well. The system includes the downhole pump disposed in a well, the downhole pump having a motor, and a cable having at least one strength member layer bonded to a cable core, in which a first end is connected to a power source disposed at a surface of the well and a second end is connected to the downhole pump. The cable is configured to support and power the downhole pump in the well.

9 Claims, 6 Drawing Sheets

(56) References Cited

U.S. PATENT DOCUMENTS

| | | | |
|---|---|---|---|
| 5,070,940 A * | 12/1991 | Conner et al. | 166/65.1 |
| 5,086,196 A * | 2/1992 | Brookbank et al. | 174/106 R |
| 5,410,106 A * | 4/1995 | Nishino et al. | 174/105 R |
| 5,607,015 A * | 3/1997 | Bergren et al. | 166/250.01 |
| 6,127,632 A * | 10/2000 | Oswald et al. | 174/120 R |
| 6,600,108 B1 * | 7/2003 | Mydur et al. | 174/120 R |
| 6,733,203 B2 * | 5/2004 | Carlsen et al. | 403/365 |
| 8,408,312 B2 * | 4/2013 | Fielder et al. | 166/369 |
| 8,534,366 B2 * | 9/2013 | Fielder et al. | 166/378 |
| 2002/0108757 A1 * | 8/2002 | Traylor | 166/384 |
| 2006/0045442 A1 * | 3/2006 | Varkey et al. | 385/102 |
| 2006/0151194 A1 * | 7/2006 | Varkey et al. | 174/102 R |
| 2006/0242824 A1 * | 11/2006 | Varkey et al. | 29/825 |
| 2007/0000682 A1 * | 1/2007 | Varkey et al. | 174/102 R |
| 2007/0107928 A1 * | 5/2007 | Varkey et al. | 174/102 R |
| 2008/0156517 A1 * | 7/2008 | Varkey et al. | 174/107 |
| 2008/0196902 A1 * | 8/2008 | Head | 166/381 |
| 2008/0289851 A1 * | 11/2008 | Varkey et al. | 174/115 |
| 2009/0046983 A1 * | 2/2009 | Varkey et al. | 385/113 |
| 2009/0145610 A1 | 6/2009 | Varkey et al. | |
| 2009/0266536 A1 | 10/2009 | Fox et al. | |
| 2009/0283295 A1 * | 11/2009 | Varkey et al. | 174/105 R |
| 2010/0116506 A1 * | 5/2010 | Sbordone et al. | 166/345 |
| 2010/0206544 A1 * | 8/2010 | Dowling et al. | 166/75.11 |
| 2010/0206554 A1 | 8/2010 | Neuhaus et al. | |
| 2010/0288493 A1 * | 11/2010 | Fielder et al. | 166/250.15 |
| 2010/0288501 A1 * | 11/2010 | Fielder et al. | 166/311 |
| 2012/0024543 A1 * | 2/2012 | Head | 166/382 |
| 2013/0277042 A1 * | 10/2013 | Scarsdale et al. | 166/77.2 |
| 2013/0341033 A1 * | 12/2013 | Carstensen et al. | 166/372 |

OTHER PUBLICATIONS

International search report and written opinion for the equivalent PCT paten application No. PCT/US2011/038144 issued on Nov. 25, 2011.

* cited by examiner

DEPLOYMENT OF DOWNHOLE PUMP USING A CABLE

CROSS REFERENCE TO RELATED APPLICATIONS

This application claims priority to, and therefore claims benefit under 35 U.S.C. §119(e), U.S. Provisional Patent Application No. 61/349,541, filed on May 28, 2010. This provisional application is incorporated by reference in its entirety.

BACKGROUND OF INVENTION

1. Field of the Invention

Embodiments disclosed herein generally relate to a system used to power and support equipment downhole. More particularly, embodiments disclosed herein relate to a system that includes a cable capable of powering and supporting, as well as raising and lowering, equipment downhole, such as a downhole pump.

2. Background Art

In the oil and gas industry, a wide variety of systems are known for producing fluids from a subterranean formation. Oil wells typically rely on natural gas pressure to propel crude oil to the surface. In formations providing sufficient pressure to force the fluids to the surface of the earth, the fluids may be collected and processed without the use of artificial lifting systems. Oftentimes, particularly in more mature oilfields that have diminished gas pressure or in wells with heavy oil, this pressure is not sufficient to bring the oil out of the well. In these instances, the oil can be pumped out of the wells using a pumping system.

Different types of pumping systems may be disposed downhole with a well to pump the desired fluids to the surface of the earth. For example, sucker rod pumps have been previously used to pump oil to the surface in low pressure wells. More recently, though, sucker rod pumps have been replaced with electrical submersible pumps (ESPs), such as a Russian Electrical Dynamo of Arutunoff (REDA) pump, which is commercially available from Schlumberger. A submersible pump is usually deposited within the production fluids to then pump the desired fluids to the earth's surface. As such, an electrical submersible pump typically includes a motor section, a pump section, and a motor protector to seal the clean motor oil from well fluids, in which the pump is deployed in a well and receives power via an electrical cable. These pumps are typically attached to the bottom of the production string and pump oil up from the bottom of the well by generating a pressure boost sufficient to lift production fluids even in deep water subsea developments. Power to these electrical submersible pumps is typically provided by "permanent" cables designed for long-term deployment in the well.

A typical submersible pumping system includes several components, such as a submersible electric motor that supplies energy to a submersible pump, and typically some kind of connector for connecting the submersible pumping system to a deployment system. Conventional deployment systems often include production tubing, cable, and/or coiled tubing. Additionally, power is supplied to the submersible electric motor via a power cable that runs through or along the deployment system.

Multiple different types of methods may be used to deploy these types of submersible pumping systems to pump up oil from a well. One basic deployment method involves attaching a submersible pump to the bottom of the production string and then pumping oil up the production string from a selected location within the well. Power is provided to the submersible pump by a "permanent" cable that is strapped to the production string and designed for long-term deployment in the well.

For example, with reference to FIG. 1, a submersible pumping system is shown that includes a submersible pump 110 attached to a pipe string 112. The submersible pump 110 is deployed in a well 114 and includes a permanent cable 116 that terminates at the well head 118. The permanent cable 116 is used to provide power to the submersible pump 110, but typically is not capable of actually suspending or supporting the submersible pump 110 in the well 114. Rather, the submersible pump 110 is attached to the pipe string 112, as the pipe string 112 supports the submersible pump 110 in the well 114, and the permanent cable 116 is then typically fixed to the pipe string 112 with metal straps (not shown). After attaching the cable 116 to the pipe string 112, the cable 116 is then cut at the well head 118 to the exact length needed to power the submersible pump 110 downhole. Once the permanent cable 116 is cut, both the submersible pump 110 and the cable 116 become a permanent fixture with the pipe string 112 in the well 114, as the entire pipe string 112 must be pulled out of the well 114 to remove the submersible pump 110 from the well 114.

Another basic deployment method for submersible pumping systems involves attaching a submersible pump to coiled tubing and running the coiled tubing down the center of the pipe string. Power is provided to the submersible pump by a power cable that is run through the center of the coiled tubing, and oil is then pumped by the submersible pump back up the pipe string. For example, with reference to FIG. 2, a deployment system is shown that includes coiled tubing 220 and coiled tubing grippers 222. The coiled tubing 220 includes a power cable disposed therein, in which the power cable normally must be injected into the coiled tubing 220, usually offsite, and then have the coiled tubing 220, along with the deployment equipment, transported to the well. To assist in deploying the coiled tubing 220, along with the submersible pump attached at an end thereof downhole, the coiled tubing grippers 222 may grip and engage the coiled tubing 220. As such, the coiled tubing grippers 222 may be powered and/or otherwise driven, such as include a chain-driven traction winch. Once the submersible pump is at the desired location, the coiled tubing 220, along with the power cable disposed inside, are cut at the well head and left in place within the well.

Further, another basic deployment method for submersible pumping systems involves a two cable method commonly referred to as a cable deployed pumping system (CDPS). This method involves lowering and suspending a submersible pump within the pipe string from a wire-rope cable with a second, non-supporting, electrical cable providing power to the pump. For example, with reference to FIG. 3, a deployment system is shown that includes a support cable 330 and a power cable 332. The support cable 330 normally is a torque-balanced wire rope support cable that is tied and/or banded together with the power cable 332 at frequent intervals as the submersible pump, attached to the ends of the support cable 330 and the power cable 332, is deployed into the well 334. Banding to keep the cables 330 and 332 together is applied by personnel at the well head 336 as the cables 330 and 332 are passed into the well 334.

After the submersible pump at the ends of the cables 330 and 332 is lowered to the desired location, the support cable 330 is attached to a hanger packoff (not shown) at the well head 336. Particularly, the support cable 330 is often attached to a polished "pony rod" that is connected to the hanger packoff using multiple splice rods, such as splice rods available from PMI Industries, Inc. The splice rods are multiple loosely coiled, steel rods that wrap around and grip the end of the polished pony rod, as well as grip the end of the wire rope support cable 330, as the ends of the pony rod and the support cable 330 butt up against each other. As such, the splice rods are designed to tighten the grip with the pony rod and support cable 330 as the tension between the pony rod and support cable 330 increases. The submersible pump is then secured in a landing seat in a packer (not shown) located at a selected location within the well 334. Once secured, the submersible pump is used to pump oil up through the well 334, such as through a pipe or production string within the well 334.

Problems may exist, however, with each of these different types of deployment methods and systems. For example, because the power cables used to power the submersible pumps are typically not strong enough to support the weight of the submersible pumping system downhole, the submersible pumping system must be provided with additional support (e.g., equipment) in the well. However, deploying the submersible pump 110 using the pipe string 112 in FIG. 1 can be an extremely labor-intensive and time-consuming process, as a workover rig is required to feed the pipe string 110 into the well 114, and the power cable 116 must be pneumatically banded at regular intervals to the outside of the pipe string 112. Further, in the event that problems occur with the submersible pump 110 after deployment, the entire process must be reversed and repeated, thereby removing the pipe string 112 section-by-section as the banding is removed and starting over.

Additionally, using the coiled tubing 220 in FIG. 2 to deploy a submersible pump downhole requires the tedious process of first injecting a power cable into the coiled tubing, then transporting the bulky, heavy reel of coiled tubing and the associated deployment equipment to the wellsite. This method also requires using customized lengths of expensive coiled tubing, as the coiled tubing must be cut and left in place in the well during pumping.

Further, with reference to FIG. 3, applying banding to the cables 330 and 332 as the cables 330 and 332 are passed down into the well 334 may create a safety hazard for the personnel applying the banding. The desire to advance the cables 330 and 332 quickly into the well tends to increase the safety risk, and the bands applied to the cables 330 and 332 tend to slip as the cables 330 and 332 are slacked and tightened, leading to potential twisting and bunching downhole. Furthermore, as with the pipe string and coiled tubing methods, if any problems are encountered during the deployment of the pump, a significant delay will be experienced as the process of retrieving the pump, correcting the issue, and redeploying will be extremely slow. Further, the power cable is not designed to withstand the stresses, pressures, and fluid infiltration that are typically encountered downhole as the oil is pumped uphole around the power cable. Accordingly, there exists a need for a system that may be deployed and retracted from the well independently from the pipe string and that is capable of withstanding the extreme downhole environment.

SUMMARY OF INVENTION

In one aspect, embodiments disclosed herein relate to a method of using a cable to deploy a downhole pump in a well. The method includes connecting the downhole pump to the cable at a surface of the well, lowering the downhole pump into the well using the cable, connecting the cable to a cable hanger, and suspending the downhole pump within the well using the cable and the cable hanger.

In one aspect, embodiments disclosed herein relate to a method of using a cable to deploy a downhole pump in a well. The method includes connecting a first end of the cable to the downhole pump, the cable having at least one strength member layer bonded to a cable core, connecting a second end of the cable to a power source at a surface of the well, disposing the downhole pump in the well, supporting the downhole pump in the well with the cable, and powering the downhole pump in the well from the power source with the cable.

In one aspect, embodiments disclosed herein relate to a downhole pump system. The system includes a downhole pump disposed in a well, in which the downhole pump comprises a motor, and a cable having at least one strength member layer bonded to a cable core, in which a first end is connected to a power source disposed at a surface of the well and a second end is connected to the downhole pump. The cable is configured to support and power the downhole pump in the well.

Other aspects and advantages of the invention will be apparent from the following description and the appended claims.

DETAILED DESCRIPTION

In the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description.

Embodiments disclosed herein relate to a system and method that use a cable to power and support equipment downhole, such as a downhole pump. For example, in addition to providing power to a downhole pump, the cable may provide support for the downhole pump, such as by using the cable to suspend and/or raise and lower the pump while downhole. The downhole pump may be any pump known in the art, such as an electrical submersible pump, described above. As such, a cable of the present disclosure may be capable of better withstanding long-term exposure to the severe environment encountered downhole, such as from the heat, the pressure, gases, fluids, and/or any other elements or conditions common to the downhole environment.

Accordingly, embodiments disclosed herein relate to and include a cable that is continuously bonded. As used herein, the term "continuously bonded" refers to a cable having multiple layers, in which each layer is completely bonded to the next layer. In such a cable, the multiple layers of the cable are completely bonded both along the axial length of the cable and across the diameter of the cable. As such, a tear and/or break to one of the layers and/or portions of the cable does not affect any other layers and/or portions of the cable.

A cable in accordance with the present disclosure may include a cable core having one or more metallic conductors with one or more polymer materials layers bonded to the metallic conductors. One or more strength member layers may be bonded to the cable core, in which the strength member layers may include one or more polymer-bonded strength members. As such, the cable may be continuously bonded from the innermost metallic conductors of the cable to the outermost strength member layer of the cable.

Because the cable has a consistent jacketed circular profile that resists well fluid influx, it provides an excellent surface to form a pressure seal such that the cable could actually be brought out of the well and terminated external to the wellhead if need be. Because the jacketed strength members are bonded together in a continuous matrix, torque imbalance issues are virtually eliminated as compared to the two-cable method. The cable may be spliced using an electromechanical connection, making re-use in wells of different depths much more feasible.

Figure 1:
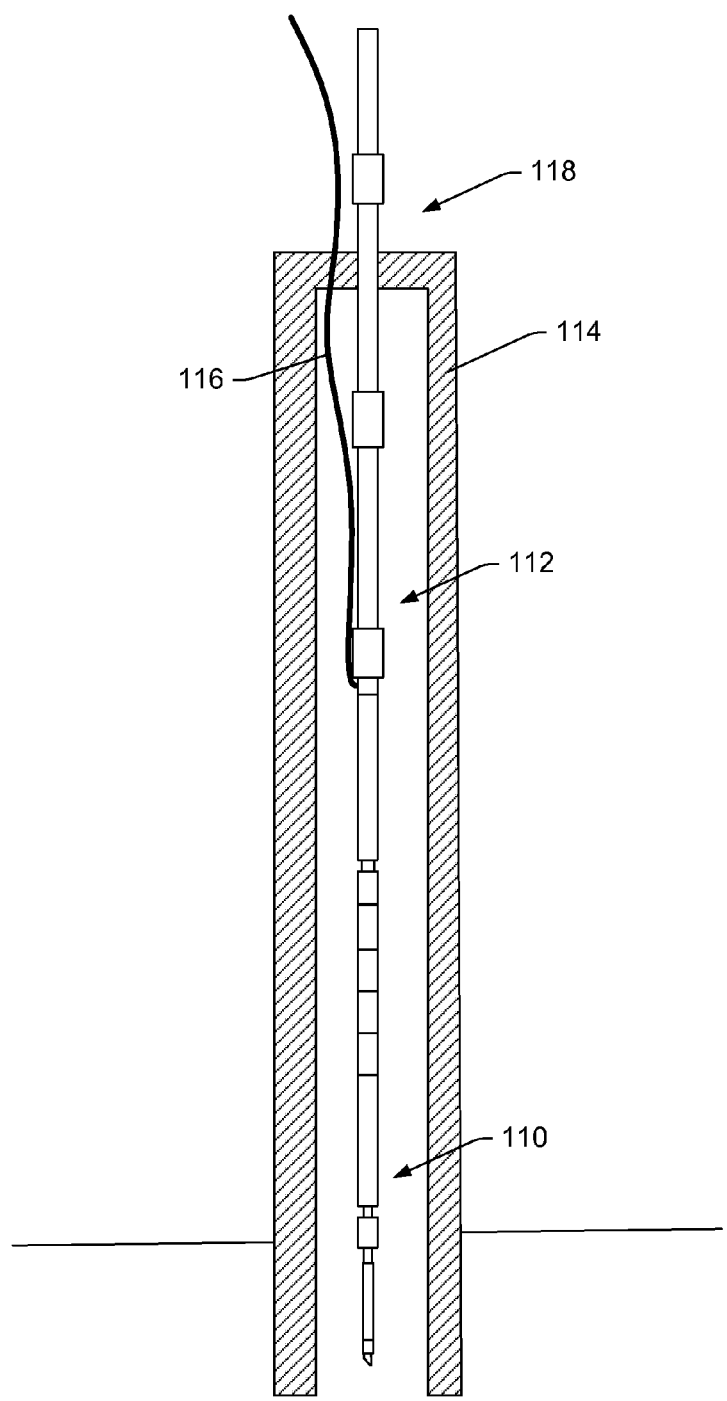
FIG. 1 shows a depiction of a system to deploy a downhole pump into a well.
Figure 2:
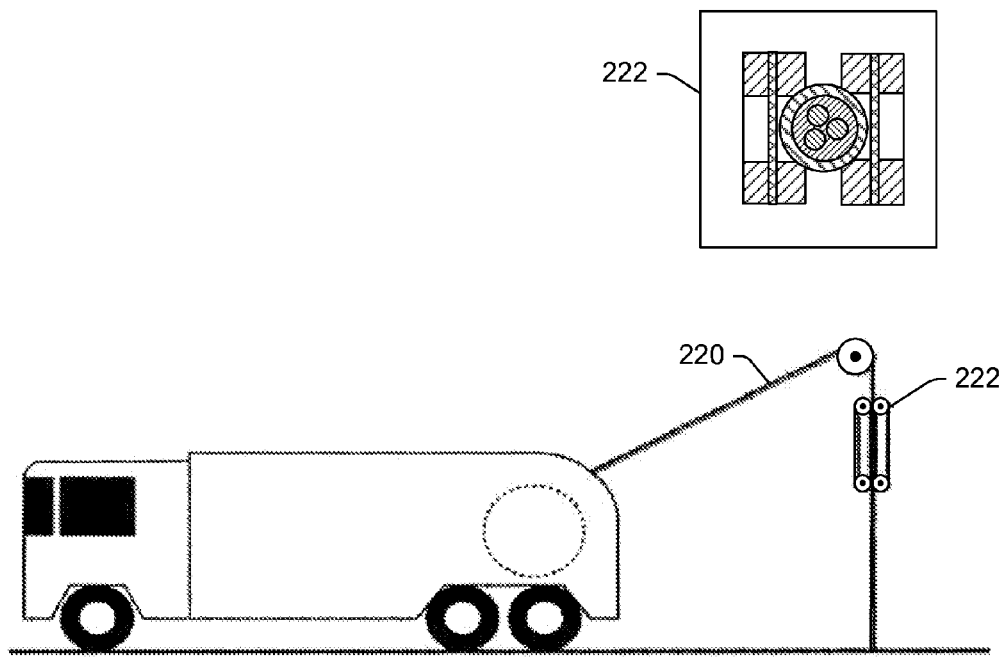
FIG. 2 shows a depiction of a system to deploy a downhole pump into a well.
Figure 3:
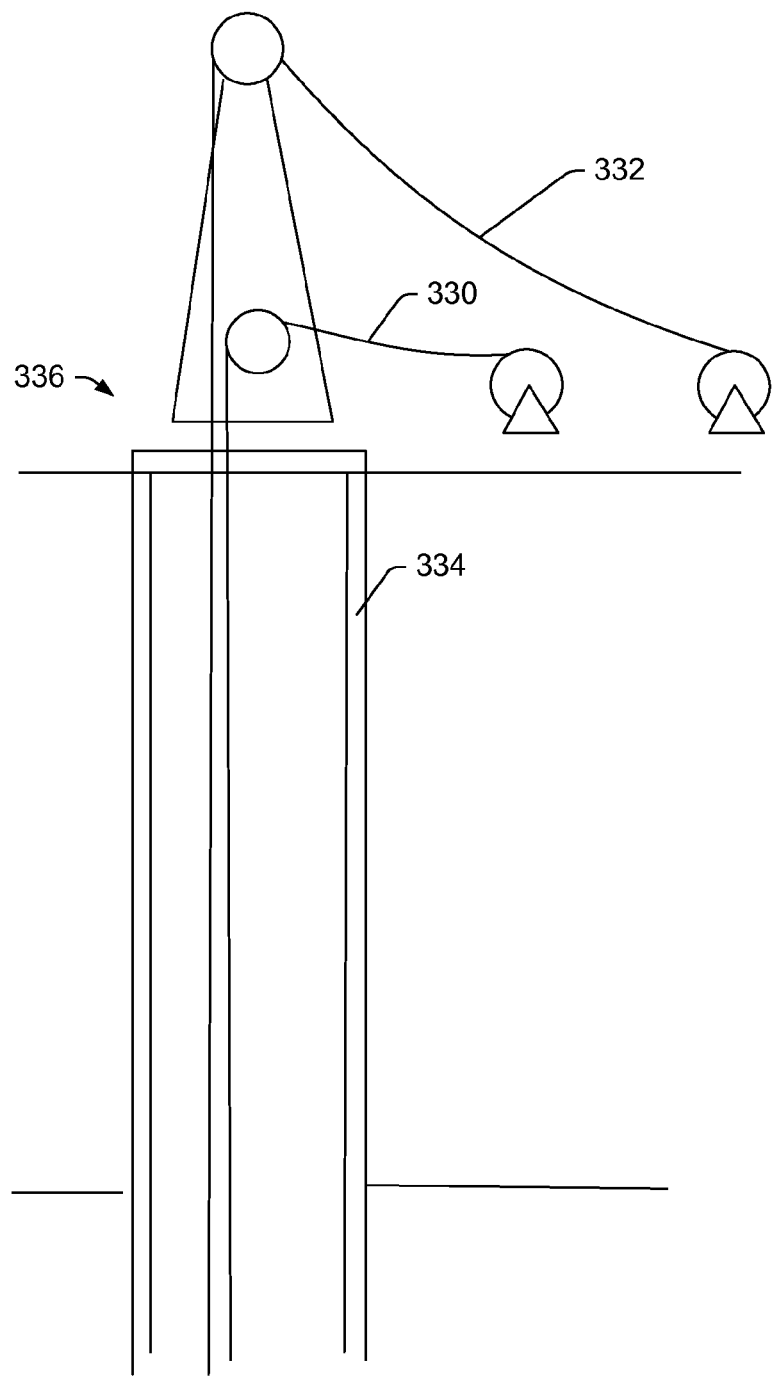
FIG. 3 shows a depiction of a system to deploy a downhole pump into a well.
Figure 4A:
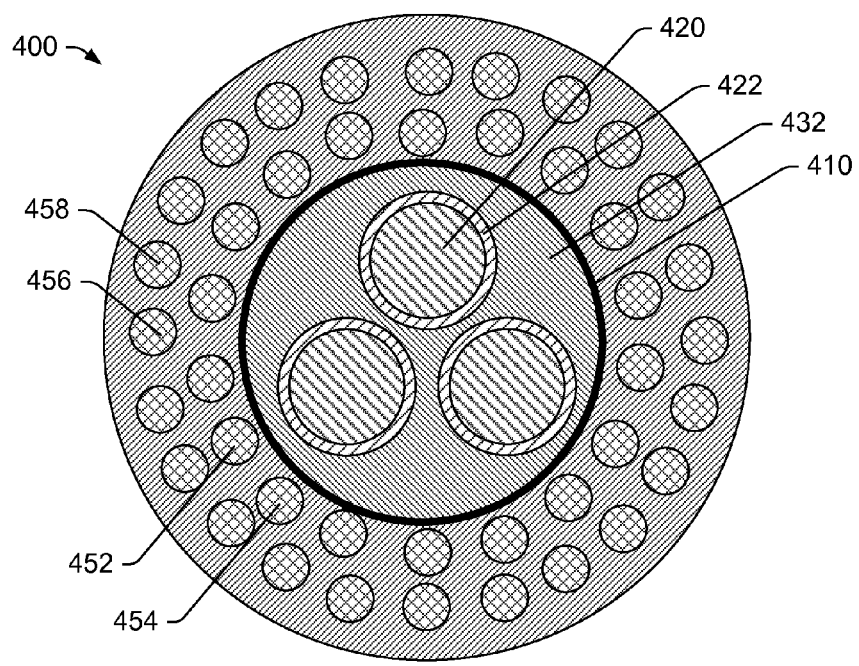
FIGS. 4A and 4B show multiple cross-sectional views of a cable in accordance with one or more embodiments of the present disclosure are shown.
Figure 4B:
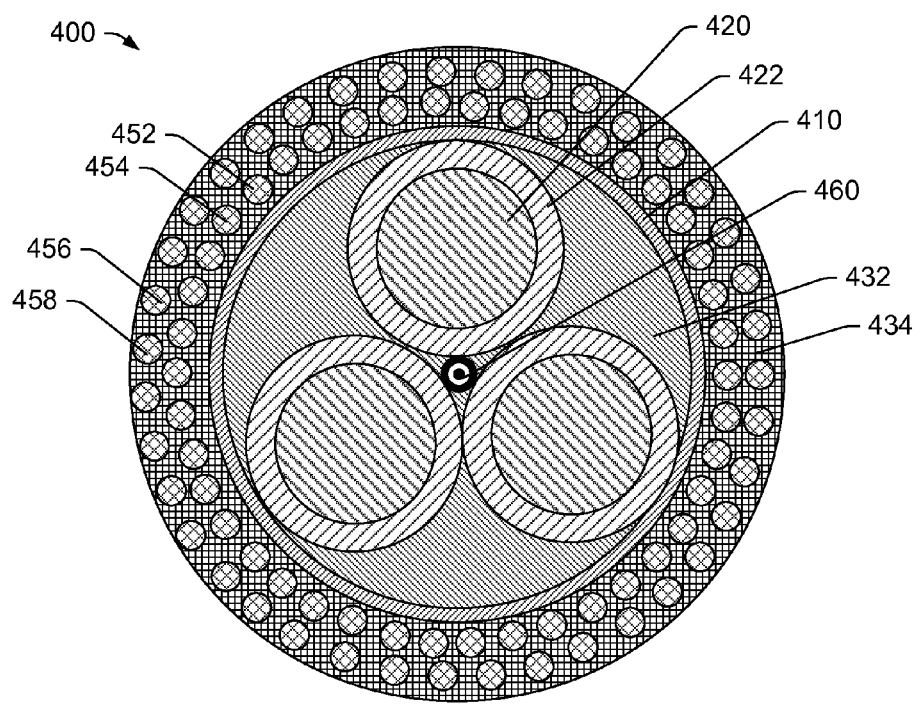

Referring now to FIGS. 4A and 4B, multiple cross-sectional views of a cable 400 in accordance with one or more embodiments of the present disclosure are shown. As previously mentioned, the cable 400 may include a cable core 410 having one or more strength member layers (discussed more below) bonded to the cable core 410. Further, the cable core 410 may include one or more metallic conductors 420, in which one or more polymer layers may be bonded to the metallic conductors 420. The metallic conductors 420 may be a solid conductor wire, such as shown particularly in FIGS. 4A, or may be a stranded conductor wire. Further, the metallic conductors 420 may be a shaped wire and/or may be a compacted wire, as desired.

As shown in FIGS. 4A and 4B, the cable 400 may include a first polymer layer 422 and a second polymer layer 432. In such an embodiment, the first polymer layer 422 may be bonded to the metallic conductor 420 of the cable 400, and the second polymer layer 432 may be bonded to the first polymer layer 422. The polymer layers 422 and 432 may be bonded to the cable 400, such as by heating the metallic conductors 420 and/or by passing the cable 400 through an extruder. Further, if desired, a jacketing polymer layer 434, as shown in FIG. 4B, may be included within the cable 400, such as extruded over and/or bonded to the cable 400 to complete the cable core 410. An extruder, in accordance with the present disclosure, may be used to shape an outer-profile of the cable as the cable passes through the extruder. Also, those having ordinary skill in the art will appreciate that, though a cable only having two polymer layers within the cable core is shown, the present disclosure is not so limited, as a cable of the present disclosure may only include one polymer layer, or may include three or more polymer layers.

Accordingly, the polymer layers of the cable may include one or more polymer materials, as desired. For example, in one embodiment, the first polymer layer 422 may include a modified (i.e., amended) polymer material, such as to chemically bond with the metallic conductor 420, and/or may include a non-modified polymer material, such as a polymer material having a low dielectric constant, for the primary insulation for the metallic conductor 420. Furthermore, the second polymer layer 432 may include a soft polymer material. In an embodiment in which the first polymer layer 422 includes both the modified polymer and non-modified polymer, the modified and non-modified polymers may be bonded to the metallic conductor 420 during extrusion of the cable 100. In one embodiment, the modified and non-modified polymers may be co-extruded on to the metallic conductor 420 after heating, such as by using a co-extruder during the extrusion process. Co-extrusion may utilize melting and delivering a desired amount of the different polymer materials through a single extrusion die or head to have a desired shape and/or size for the cable.

Those having ordinary skill in the art will appreciate that the material used for the metallic conductor for a cable in accordance with the present disclosure may include any metallic conducting material known in the art. As such, in one or more embodiments, a metallic conductor may include one or more of the following: a solid copper wire, a stranded copper wire, a compacted copper wire, a shaped copper wire, a copper clad steel wire, an aluminum clad steel wire, a titanium clad copper wire, and/or any other conducting wire known in the art.

Further, as discussed above, a cable in accordance with the present disclosure may include at least one strength member layer bonded to the cable core. For example, as shown in FIGS. 4A and 4B, the cable 400 may include a first strength member layer 452 and a second strength member layer 456, in which the strength member layers 452 and 456 may include multiple polymer-bonded strength members 454 and 458, respectively. However, those having ordinary skill in the art will appreciate that the present disclosure is not so limited, as a cable of the present disclosure may only include one strength member layer, or may include three or more strength member layers.

The strength member layers 452 and 456 may be bonded to the cable 400, such as by heating the cable 400 and/or the polymer-bonded strength members 454 and 458 and by passing the cable 400 through an extruder. For example, when forming the strength member layer 452, the polymer-bonded strength members 454 may be cabled over the cable core 410 and heated such that the outer polymer layer of the polymer-bonded strength members 452 slightly melt and deform against each other and against the cable core 410. As the polymer-bonded strength members 454 are cabled together, the polymer-bonded strength members 454 may substantially fill all of the interstitial spaces about the cable 400. After cabling the polymer-bonded strength members 454 over the cable core 410, the cable 400 may include the first strength member layer 452 formed from the polymer-bonded strength members 454.

In a similar fashion, to form the second strength member layer 456, the polymer-bonded strength members 456 may be cabled over, heated, and bonded to the first strength member layer 452. Additional polymer material may also be added to the cable 400, as desired, to give the cable 400 a desired size and shape, such as a circular profile. Accordingly, the multiple layers of the cable 400 are completely bonded both along the axial length and across the diameter of the cable 400 to form a continuously bonded cable.

Referring now to only FIG. 4B, the cable 400 may further include one or more additional communication wires disposed therein. For example, a communication wire 460 may be included within the cable 400, such as by having the communication wire 460 disposed within the cable core 410 of the cable 400. As such, in one embodiment, the communication wire 460 may include an optical fiber, in which the optical fiber may be used to transmit data through the cable 400 to enable further communication through the cable 400.

The designs in the present application are for permanent electromechanical cables for use with submersible pumps used to extract oil from low-pressure wells. The cables are designed to provide both support and power to the pumps while withstanding the conditions of long-term exposure to well fluids, gas influx, temperatures and pumping pressures in the downhole environment. As an option, optical fibers can be included in the design to provide telemetry depth-referenced data such as temperature, strain, etc. The ESP is lowered down the production string using a single cable until it seats at the bottom of the string. Because support and power are supplied by a single cable, deployment does not require the time, effort and safety risks of pneumatic banding, or the time-intensive process of running a power cable through a coiled tube. With the one-cable method, the ESP can be deployed and removed from the well at much higher speeds and much more cost effectively than with other methods. One cable also means less and lighter equipment to transport to the well site and a smaller footprint at the site.

Figure 5:
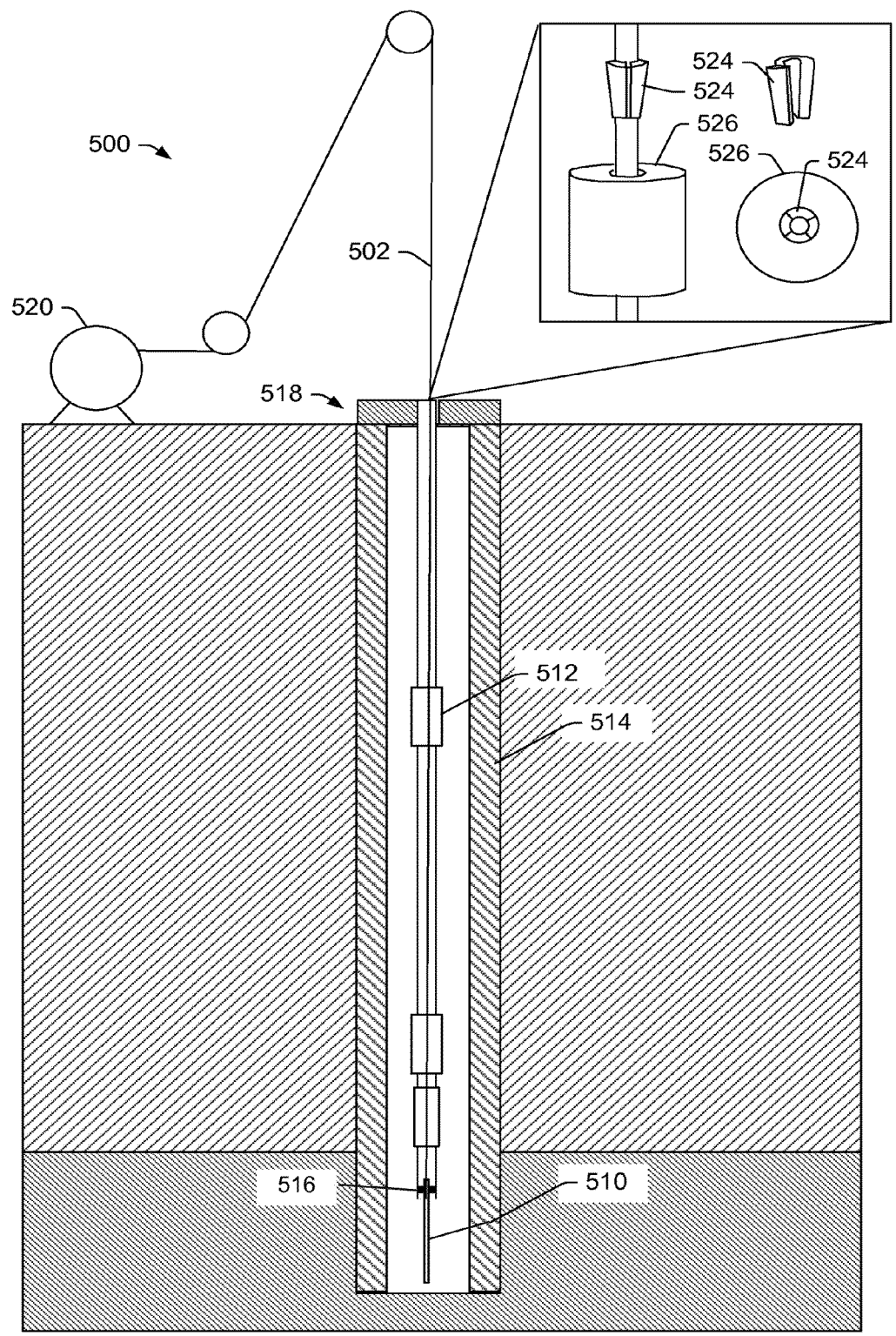
FIG. 5 shows a view of a downhole pump system in accordance with one or more embodiments of the present disclosure are shown.

Referring now to FIG. 5, a system 500 to deploy a downhole pump 510 within a well 514 is shown. The system 500 includes a pipe string 512 used to pump up oil produced by the well 514, in which the downhole pump 510 may be lowered through the well head 518 and into the well 514 using a cable 502. The cable 502 may be similar to the cable described above with respect to FIGS. 4A and 4B. As such, the cable 502 is designed to provide both power and support to the downhole pump 510 while withstanding the exposure to the extreme fluids, gas influx, temperatures, and pressures common to the downhole environment.

The deployment of the downhole pump 510 may begin with connecting the cable 502 to the downhole pump 510 and disposing the downhole pump 510 within the well 514, such as by using a crane. When connecting the cable 502 to the downhole pump 510, and/or any other downhole equipment, the cable 502 may be prepared to receive a termination. Particularly, one or both of the ends of the cable 502 may be prepared to receive a termination, such as to enable the cable 502 to mechanically and electrically connect to other components (e.g., the downhole pump 510) and/or to protect the ends of the cable 502. As such, a termination in accordance with the present disclosure may include a rope socket termination.

After connecting the cable 502 to the downhole pump 510, the downhole pump 510 may be lowered into the well 514 using, for example, a winch 520. The winch 520 may be a rotating traction winch with a rotating drum, and/or may be a linear traction winch with a take up reel. The downhole pump 510 may be lowered into the well 514 until disposed at a desired location within the well 514. For example, the downhole pump 510 may be lowered into the well 514 until seated at the bottom of the string 512, such as seated upon a landing seat 516 disposed within and/or at the end of the string 512.

After connecting the cable 502 to the downhole pump 510, the downhole pump 510 may be lowered into the well 514 using, for example, a winch 520. The winch 520 may be a rotating traction winch with a rotating drum, and/or may be a linear traction winch with a take up reel. The downhole pump 510 may be lowered into the well 514 until disposed at a desired location within the well 514. For example, the downhole pump 510 may be lowered into the well 514 until seated at the bottom of the string 512, such as seated upon a landing seat (not shown) disposed within and/or at the end of the string 512.

After being lowered into the well 514, a space out procedure may be conducted to affix and/or otherwise dispose and seat the downhole pump 510 within the well 514. As part of the procedure, the cable 502 may be supported by a cable clamp (not shown), such as at the well head 518, to at least temporarily support the cable 502. Then, a cable hanger 522 may be installed at the well 514, such as at the well head 518, that is used to support the cable 502 and the downhole motor 510 therefrom. As shown (FIG. 5 shows multiple views of the cable hanger 522), the cable hanger 522 may include a multi-part wedge 524 that seats within a body 526, in which the cable 502 may be secured within the multi-part wedge 524.

The multi-part wedge 524 is then secured about the cable 502, in which the cable 502 may be cut and prepared to receive another termination. Particularly, similar to above, the cable 502 may be prepared to receive a termination, such that the cable 502 may be able to mechanically and electrically connect to other components uphole, such as a power source disposed at the surface of the well 514. After preparing the termination for the cable 502, the cable clamp may be removed from the cable 502, and the cable 502, with the downhole pump 510 connected at end thereof, may be lowered until seated within the cable hanger 522. At this point, any connectors and/or other components connected to or protruding from the cable 502 and well 514 are removed, and the well 514 is sealed by installing a top flange. Accordingly, the cable 502 may be used to provide support and power to the downhole motor 510 such that the downhole motor 510 may be able to pump oil back uphole and out of the well 514.

If desired, recovery of the cable 502 may be accomplished by substantially following a reverse order of the deployment method described above. Further, in the event that the downhole pump 510 becomes stuck in the well 514, a predetermined amount of tension may be placed on the cable 502 that may cause shear screws, if installed within the terminations of the cable 502, to shear and release. This may free the end of the cable 502, thereby leaving the downhole pump 510 within the well 514. At this point, standard fishing techniques, such as grapple and overshot techniques, may be used to retrieve the downhole pump 510.

Figure 6:
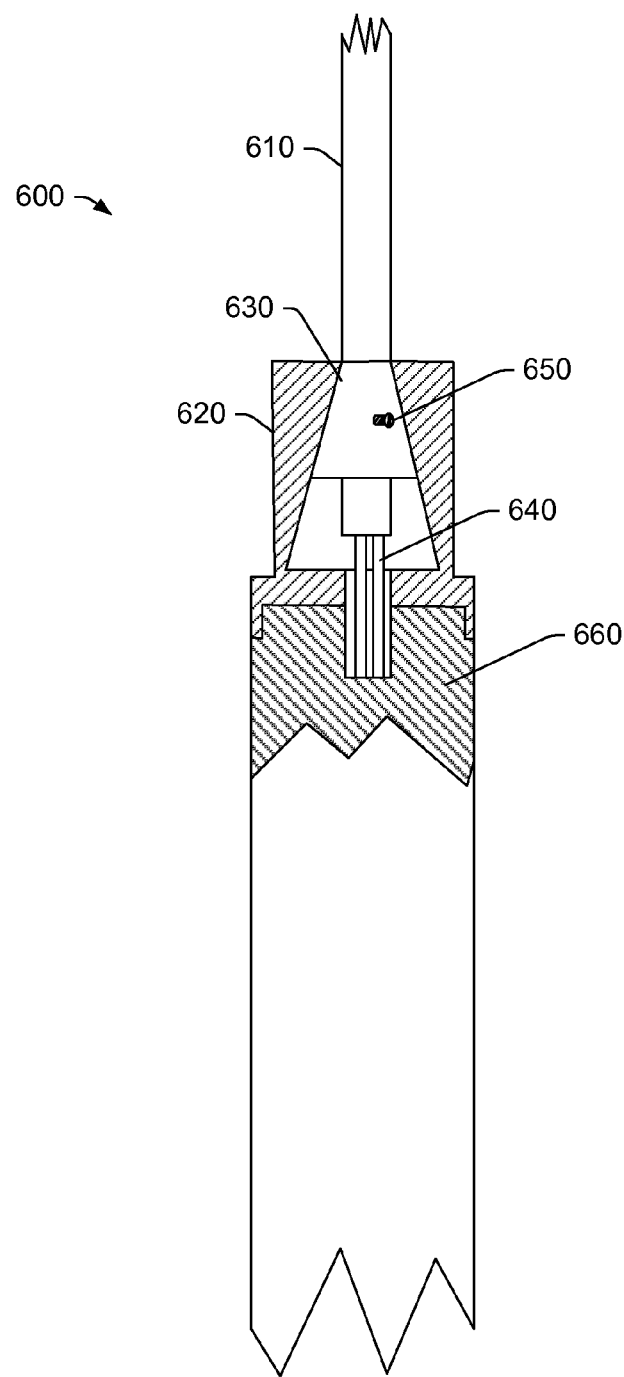
FIG. 6 shows an approximate illustration of a rope socket assembly mated with a pump.

FIG. 6 shows an approximate illustration of an example of an assembly 600 with a cable 610, a rope socket housing 620, a rope socket cone 630, conductors 640, a shear screws 650 and a pump 660.

Single-cable ESP Deployment

Once a candidate well has been identified as acceptable to install an ESP and adequately prepared, operations can commence to begin deployment of the ESP.

Termination

The deployment operation will commence with the preparation of the downhole end of the cable for termination. The rope socket housing and associated hardware is first installed on the cable. Then the cable jackets are removed to a prescribed length. Rope socket cones are installed and the conductors are prepared for splicing. The downhole termination is unique in that it is sealed from wellbore fluids via cable jacket, o-rings and a compensated seal chamber located in the pump. Next the pump rope socket head is installed and mated with the rope socket housing. Following termination of the downhole end of the cable, the deployment system is rigged up and the pump assembly is made up in the well using a crane. The conductors protruding from the rope socket head are spliced into the pump assembly and the rope socket head mated with the pump. The pump is then ready for deployment.

Deployment

Standard deployment can be by at least two means, a traction winch with a rotating drum or via injection using a linear traction winch and take up reel. The pump assembly is lowered into the well via the traction winch until it tags up on the landing seat. Once the seat is tagged, a space out procedure is engaged. As part of this procedure, the cable will be supported in a cable clamp, then afterwards a split cable hanger will be installed on the cable at a prescribed location determined during the space-out. The cable will be held in place by a set of slips seated in the split cable hanger assembly. When the split cable hanger and slips have been securely placed around the cable, the cable will be cut and prepared to receive a termination rope socket similar to the downhole rope socket. Once the termination has been completed, the terminated end of the cable will be connected to the free cable end via fme-chanical connector. The cable is then hoisted sufficiently to remove the cable clamp and afterwards lowered into the well until the split cable hanger is seated. At this point, the mechanical connector is removed and the uphole conductors are spliced into the penetrator pigtails. The well is then sealed by installing the top flange.

Recovery

Recovery of the cable is accomplished in reverse of the deployment in that the top flange of the wellhead is removed, the cable conductors are cut free from the penetrator, and a mechanical connector is attached between the uphole termination and the free end of the cable. The cable is then pulled until the pump unseats and the split cable hanger clears the wellhead. At this point, the split cable hanger is removed, a clamp placed on the cable to allow slack at the surface and the mechanical connector is replaced by a spoolable connector. Tension is applied to the cable to remove the clamp and the cable is spooled onto a take up winch until the pump reaches the top of the well. At this point, the pump is secured at the wellhead and the rope socket head removed. The pump is then removed from the well via crane.

Fishing

In the event that the pump becomes stuck in the well, a predetermined amount of pull on the cable will cause shear screws on the rope socket head to release, freeing the cable and leaving the pump in the well. At this point, fishing would be accomplished by conventional grapple and overshot techniques. Should the cable break and fall into the well, fishing of the cable would be via cable spear.

Advantageously, embodiments disclosed herein may provide a method and system to power and support downhole equipment. Particularly, embodiments disclosed herein may provide a continuously bonded cable capable of providing power and support to a downhole pump, such as by deploying and retracting an electric submersible pump (or other equipment) downhole without the assistance of a pipe string, rig, and/or other deployment device. Because support and power are supplied by a single cable, deployment does not require the time, effort, and/or safety risks common to other deployment methods, such as from using pneumatic banding, or the time-intensive process of running a power cable through a coiled tube. With a single cable method, the downhole pump may be deployed into and removed from the well at much higher speeds and much more cost effectively than with other methods. Further, a single cable also enables lighter equipment with a smaller footprint to be transported to and used at the well site.

As such, embodiments disclosed herein may provide for a cable that is capable of one or more of the following: withstanding the harsh conditions common to the downhole environment; supporting the weight of downhole equipment, such as a bottom hole assembly and/or an electrical submersible pump; having a smooth, easily sealable polymeric jacket; splice-able for reuse in other wells and/or at other lengths; and/or provides power to downhole equipment, such as a bottom hole assembly and/or an electrical submersible pump.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of using a cable to deploy a downhole pump in a production string of a cased well, comprising:
   providing a cable that comprises a smooth polymeric jacket surrounding three conductors for delivery of electrical power to a downhole pump;
   connecting the downhole pump to the cable at a surface of the well wherein the cable comprises a rope socket housing mated to a rope socket head wherein the rope socket head is mated to the downhole pump via shear screws, the shear screws being shearable responsive to application of a predetermined amount of tension to the cable to free the cable from the rope socket head and from the downhole pump;
   lowering the downhole pump into the production string using the cable to seat the downhole pump at an end of the production string;
   suspending the cable while terminating an end of the cable and while connecting at least a portion of a cable hanger to the cable wherein the cable hanger directly contacts an outer surface of the smooth polymeric jacket of the cable and wherein the cable is releasable from the cable hanger responsive to application of an amount of tension to the cable;
   seating the cable hanger at the well; and
   forming a pressure seal with the outer surface of the smooth polymeric jacket of the cable at the surface of the well for sealing against well fluid and for terminating the cable external to a wellhead of the well.

2. The method of claim 1, wherein the downhole pump comprises an electrical submersible pump.

3. The method of claim 1, further comprising:
   deploying the cable from a winch disposed at the surface of the well.

4. The method of claim 1, wherein the cable hanger comprises a multi-part wedge, wherein the connecting the cable to the cable hanger comprises:
   securing the cable within the multi-part wedge of the cable hanger.

5. The method of claim 1, wherein the cable comprises a cable core and at least one strength member layer bonded to the cable core.

6. The method of claim 5, wherein the cable core comprises at least three metallic conductors and at least one polymer layer bonded to the at least three metallic conductors, and wherein the cable is continuously bonded from the at least three metallic conductors to the at least one strength member layer.

7. The method of claim 5, wherein the at least one strength member layer comprises a plurality of polymer-bonded strength members.

8. The method of claim 5, wherein the at least one strength member layer comprises a first strength member layer and a second strength member layer, wherein the first strength member layer is bonded to the cable core, and wherein the second strength member layer is bonded to the first strength member layer.

9. The method of claim 1, wherein the cable comprises an optical fiber disposed therein, the method further comprising:
   transmitting strain data using the optical fiber of the cable.

* * * * *